(12) United States Patent
Amer et al.

(10) Patent No.: US 12,506,904 B2
(45) Date of Patent: Dec. 23, 2025

(54) OUT-OF-THE-LOOP SHADE ELIMINATION TECHNIQUE

(71) Applicant: ATI Technologies ULC, Markham (CA)

(72) Inventors: Ihab M. A. Amer, Markham (CA); Konstantin Moskvitin, Markham (CA); Haibo Liu, Markham (CA); Mehdi Saeedi, Markham (CA); Ho Hin Lau, Markham (CA); Mehdi Semsarzadeh, Markham (CA)

(73) Assignee: ATI Technologies ULC, Markham (CA)

(*) Notice: Subject to any disclaimer, the term of this patent is extended or adjusted under 35 U.S.C. 154(b) by 88 days.

(21) Appl. No.: 18/189,831

(22) Filed: Mar. 24, 2023

(65) Prior Publication Data

US 2024/0323451 A1 Sep. 26, 2024

(51) Int. Cl.
| | | |
|---|---|---|
| *H04N 11/02* | (2006.01) | |
| *H04N 19/12* | (2014.01) | |
| *H04N 19/13* | (2014.01) | |
| *H04N 19/156* | (2014.01) | |
| *H04N 19/176* | (2014.01) | |
| *H04N 19/61* | (2014.01) | |
| *H04N 19/85* | (2014.01) | |

(52) U.S. Cl.
CPC ............ *H04N 19/85* (2014.11); *H04N 19/12* (2014.11); *H04N 19/13* (2014.11); *H04N 19/156* (2014.11); *H04N 19/176* (2014.11); *H04N 19/61* (2014.11)

(58) Field of Classification Search
CPC ........ H04N 19/85; H04N 19/12; H04N 19/13; H04N 19/156; H04N 19/176; H04N 19/61
USPC ........... 375/240.12; 345/426, 501; 348/9.051
See application file for complete search history.

(56) References Cited

U.S. PATENT DOCUMENTS

| | | | |
|---|---|---|---|
| 10,712,565 B2 | 7/2020 | Mammou | |
| 2007/0018979 A1* | 1/2007 | Budagavi | G06T 15/506 345/426 |
| 2010/0208099 A1* | 8/2010 | Nomura | H04N 23/88 348/E9.051 |
| 2012/0320067 A1* | 12/2012 | Iourcha | G06T 1/20 345/501 |
| 2016/0330469 A1 | 11/2016 | Amer et al. | |
| 2017/0076481 A1* | 3/2017 | Koga | G02B 21/0032 |
| 2019/0066272 A1* | 2/2019 | Norkin | G06T 3/20 |
| 2022/0312029 A1 | 9/2022 | Liu | |
| 2024/0015326 A1* | 1/2024 | Ray | H04N 19/105 |

OTHER PUBLICATIONS

Nilson, J., "Inter-Picture Prediction for Video Compression using Low Pass and High Pass Filters", Thesis submitted to Department of Information Technology, Uppsala Universitet, Sweden, Sep. 2017, 87 pgs.

Yan, J. C. K., "Statistical Methods for Film Grain Noise Removal and Generation", Thesis submitted to Department of Electrical and Computer Engineering, University of Toronto, 1997, 95 pgs.

* cited by examiner

*Primary Examiner* — Jayanti K Patel
*Assistant Examiner* — Richard B Carter
(74) *Attorney, Agent, or Firm* — Volpe Koenig

(57) ABSTRACT

A technique for performing video operations is provided. The technique includes decoding underlying content to obtain a decoded block; and applying a shade pattern to the decoded block to obtain a final block.

20 Claims, 5 Drawing Sheets

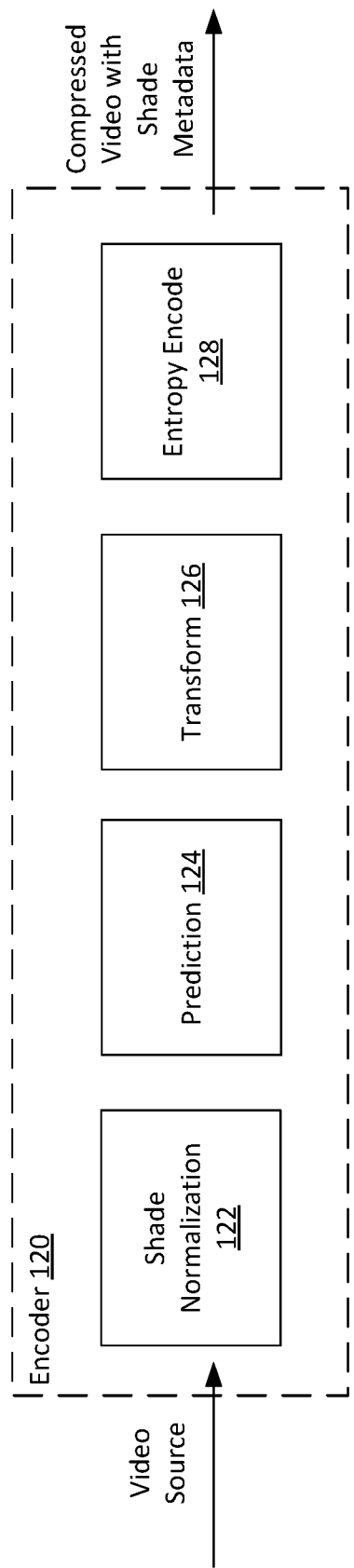
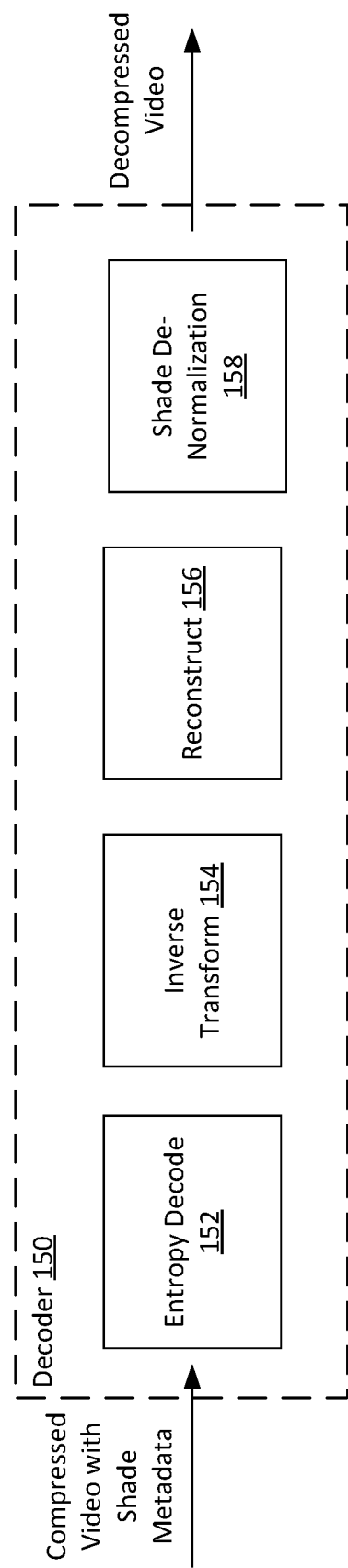
FIG. 2A
FIG. 2B

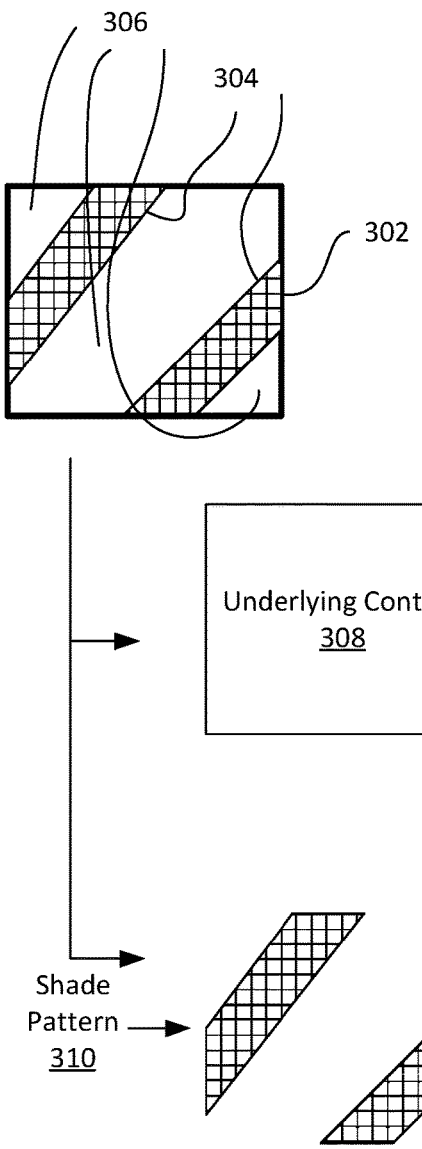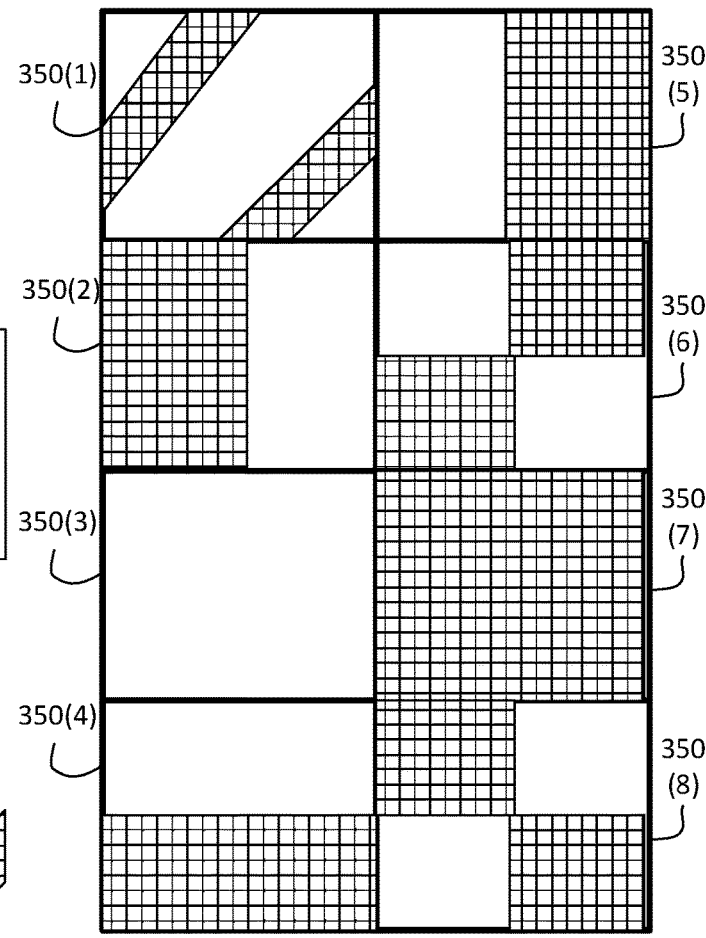
FIG. 3A
FIG. 3B

FIG. 4

OUT-OF-THE-LOOP SHADE ELIMINATION TECHNIQUE

BACKGROUND

Video encoding and decoding are processes by which video is compressed to greatly reduce the amount of data needed to represent the video. Improvements to video encoding and decoding are constantly being made.

BRIEF DESCRIPTION OF THE DRAWINGS

A more detailed understanding may be had from the following description, given by way of example in conjunction with the accompanying drawings wherein:

FIG. 2A presents a detailed view of the encoder of FIG. 1, according to an example;

FIG. 2B represents a decoder for decoding compressed data generated by an encoder such as the encoder of FIG. 2A, according to an example;

FIG. 3A illustrates extraction of a patterned shade area, according to an example;

FIG. 3B illustrates example shade templates;

FIG. 4 illustrates an example portion of an image, according to an example;

DETAILED DESCRIPTION

A technique for performing video operations is provided. The technique includes decoding underlying content to obtain a decoded block; and applying a shade pattern to the decoded block to obtain a final block.

Figure 1:
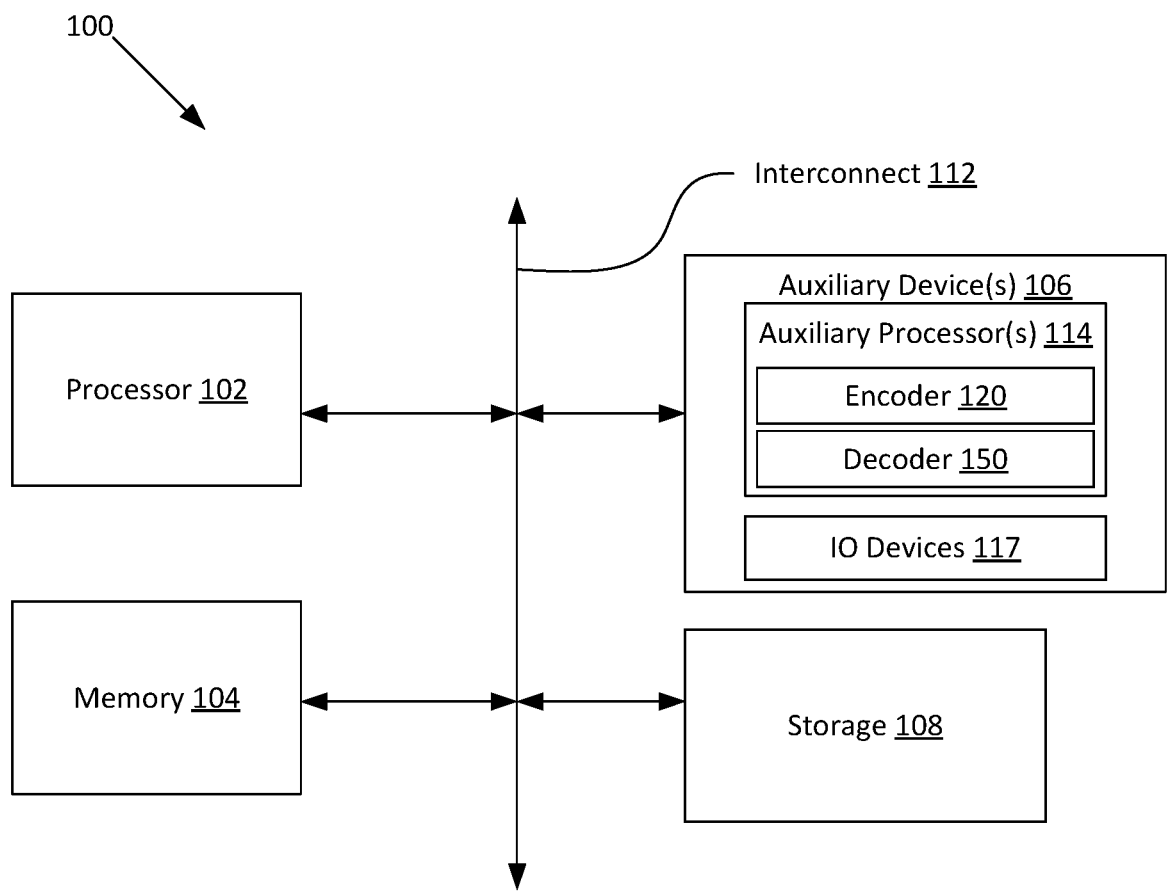
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 108, an one or more auxiliary devices 106. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary processors 114 includes one or both of an encoder 120 and a decoder 150. An encoder 120 generates encoded video based on input video. The encoded video is compressed according to any technically feasible standard or technique, such as H.264, H.265, AV1, VP9, or any other compression standard or technique. A decoder consumes encoded video and generates decoded video as output, for some purpose such as display, storage, editing, transmission, or any other purpose. Encoding video generally includes converting a raw video format, which specifies raw data (e.g., colors per pixel), into an encoded format, which is, in some examples, compressed. The encoding may result in a reduction of the amount of data needed for storage of the video (compression) and/or may result in a loss of quality (lossy encoding). Although a single device is illustrated with both an encoder 120 and a decoder 150, it should be understood that in some examples, the encoder 120 is included in a different device than the decoder 150. In other words, in some examples, a first device includes an encoder 120 and a second device includes a decoder 150. The first device encodes video using the encoder 120, and sends that video to the second device, which decodes that video using the decoder 150.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

The video encoder 120 and video decoder 150 are each implemented as software, hardware (e.g., a fixed function circuit, a processor, or other circuit configured to perform the operations described herein), or a combination thereof. In some examples, the encoder 120 or decoder 150 is stored as software in memory 104 and executed by the processor 102. In other examples, the encoder 120 or decoder 150 is fixed function hardware controlled at the direction of the processor 102. In yet another example, the encoder 120 or decoder 150 is included within a graphics processing device.

FIG. 2A presents a detailed view of the encoder 120 of FIG. 1, according to an example. The encoder 120 accepts source video, encodes the source video to produce compressed video (or "encoded video"), and outputs the compressed video along with shade metadata. The encoder 120 includes a shade normalization block 122, a prediction block 124, a transform block 126, and an entropy encode block 128. In some alternatives, the encoder 120 implements one or more of a variety of video encoding standards (such as MPEG2, H.264, or other standards), with the prediction block 124, transform block 126, and entropy encode block 128 performing respective portions of those standards and the shade normalization block 122 not being a part of a standard. In other alternatives, the encoder 120 implements a video encoding technique that is not a part of any standard.

The prediction block 124 performs prediction techniques to reduce the amount of explicit information needed to be stored for a particular frame. Various prediction techniques are possible. One example of a prediction technique is a motion prediction based inter-prediction technique, where a block in the current frame is compared with different groups of pixels in the same or a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with the best score such as the lowest sum of absolute differences is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video.

The transform block 126 performs an encoding step which is typically though not necessarily lossy, and converts the data of the block into a compressed format. An example transform that is typically used is a discrete cosine transform (DCT). The discrete cosine transform converts data for the block (where prediction is used, the residual of the block) into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a higher QP requires fewer bits. Visually, a higher QP is associated with less detail and a lower QP is associated with more detail.

The entropy encode block 128 performs entropy coding on the coefficients of the blocks. Entropy coding is a lossless form of compression. Examples of entropy coding include context-adaptive variable-length coding and context-based adaptive binary arithmetic coding. In general, the entropy coding involves reducing the amount of data required to store a set of data by reducing the number of possible values that can be stored in that set of data. The entropy coded transform coefficients describing the residuals, the motion vectors, and other information such as per-block QPs are output and stored or transmitted as the encoded video.

The shade normalization block 122 performs shade normalization to modify the incoming video (i.e., the video source) and to generate shade metadata. More specifically, incoming video sometimes contains patterned "shade" or luminosity differences. Such differences can lead to an increase in the amount of data included in compressed video, as compared with a situation in which such patterned shade or luminosity differences did not appear. In an example, a video game generates an output frame. In this output frame, a light pattern is applied to a texture, resulting in a grid-like pattern of light and dark areas on that pattern. These light and dark areas are the patterned shade, and the texture represents underlying content. This frame is output to the encoder 120. Due to the presence of the patterned shade, the amount of data required for the encoded video is greater than if such patterned shade did not exist, since this shade represents additional information that needs to be encoded. This additional information that needs to be encoded is represented relatively inefficiently in most codecs, since such information can have high spatial frequency as well as high luminosity value differences. The shade normalization block 122 reduces the total amount of data needed for encoded video by representing the patterned shade as low bitrate side band information, removing that patterned shade from the input video, and encoding the video with the removed patterned shade. The output of such an encoder 120 is thus encoded video and the patterned shade information included as side-band information. The decoder 150 decodes the encoded video and then applies the side-band information to reconstruct the original video including the patterned shade. Additional details are provided below.

FIG. 2B represents a decoder 150 for decoding compressed data generated by an encoder such as the encoder 120, according to an example. The decoder 150 includes an entropy decoder 152, an inverse transform block 154, a reconstruct block 156, and a shade de-normalization block 158. Herein, the term "first decoder portion" refers to the combination of the entry decoder 152, inverse transform block 154, and reconstruct block 156. In some examples, the "first decoder portion" includes other elements not shown that result in decoding of a block of frame according to a standard. Here, the term "second decoder portion" refers to the shade de-normalization block 158. The entropy decoder 152 converts the entropy encoded information in the compressed video, such as compressed quantized transform coefficients, into raw (non-entropy-coded) quantized transform coefficients. The inverse transform block 154 converts the quantized transform coefficients into the residuals. The reconstruct block 156 obtains the predicted block based on the motion vector and adds the residuals to the predicted block to reconstruct the block. The shade de-normalization block 158 applies the shade metadata to the decoded data received from the reconstruct block 156 to generate the output video.

Note that the operations described for FIGS. 2A and 2B only represent a small subset of the operations that encoder and decoder use. In various implementations, the encoder and decoder use various alternative or additional operations.

FIGS. 3A and 3B illustrate techniques for encoding a block having a patterned shaded area. FIG. 3A illustrates extraction of a patterned shade area, according to an example. Specifically a subject block 302 of an image includes a shaded portion 304 and a non-shaded portion 306. The shade normalization block 122 analyzes the subject block 302 and extracts the underlying content 308 and a shade pattern 310. The shade pattern 310 indicates a pattern of luminance modifications for the subject block 302. When the pattern of luminance modifications is applied to the underlying content 308 (e.g., during decoding), the subject block 302 is obtained. In other words, the shade normalization block 122 determines a shade pattern 310 which represents a pattern of illumination or shade applied to some underlying content 308. The shade normalization block 122 extracts this shade pattern 310 as the shade metadata. Additionally, the shade normalization block 122 removes the effect of the shade pattern from the subject block 302 to obtain the underlying content 308, which is then encoded by the encoder 120 (e.g., processed by the prediction block 124, the transform block 126, and the entropy encode block 128). The shade pattern 310 is not encoded by the encoder 120. For decoding, the decoder 150 reconstructs the underlying content 308, and applies the shade metadata via the shade de-normalization block 158, which results in reconstruction of the block 302 as output of the decoder 150. It should be understood that the underlying content 308 represents the content of the frame without the shade pattern 310 applied. A frame comprises underlying content 308 with a shade pattern 310 applied. With the shade pattern 310 removed from the content of the frame, the underlying content 308 is what remains.

In various examples, the shade normalization block 122 uses any technically feasible means to perform the operations of FIG. 3, including determining what the shade pattern 310 is as well as determining how to generate the underlying content 308 based on the shade pattern 310 and the subject block 302. One example technique for determining the shade pattern 310 for a subject block 302 is now provided. According to this technique, for a subject block 302 the shade normalization block 122 identifies a shade pattern 310 from a reference block using a technique such as a prediction technique. The shade normalization block 122 identifies a shade pattern with which to modify the reference block that would result in a block similar to the subject block 302.

In an example, once the reference block is identified, the shade normalization block 122 modifies the reference block or subject block based on each shade pattern of a set of shade patterns to obtain a plurality of candidate blocks. Then, the shade normalization block 122 determines which candidate block is considered "most similar" to the subject block or reference block and selects the shade pattern associated with such candidate block as the shade pattern for the subject block.

In an example, shade patterns 310 indicate luminance modifications to make to different portions of a block. In such an example, in the course of modifying the reference block to obtain a plurality of candidate blocks, the shade normalization block 122 modifies the reference block by applying the luminance modifications specified by the shade pattern to the reference block. In some examples, such modification includes increasing or decreasing the luminance values of the reference block using the luminance values of the shade pattern 310 to generate a candidate block.

As stated above, in some examples, once the shade normalization block 122 has generated the candidate block, the shade normalization block 122 determines which candidate block is considered "most similar" to the subject block 302. In some examples, this determination is made using a cost metric. More specifically, in some such examples, the determination is made by calculating a cost metric for each candidate block and selecting the candidate block with the lowest or highest cost metric as the most similar block. The cost metric is any technically feasible cost metric, such as sum of absolute differences (the sum of the absolute value of the differences of the pixels in the same relative location) or any other technically feasible measure.

In some examples, the shade normalization block 122 determines the reference block from the same frame as the subject block 302 or from a different frame as the subject block 302. In some examples, the shade normalization block 122 determines the reference block by identifying a number of candidate blocks in a search window (an area around the subject block in the same or a different frame, the area being defined as the area within a radius or maximum distance from the subject block), calculating a cost metric for each such candidate block, and selecting a candidate block as the reference block with the lowest or highest cost metric. In various examples, the cost metric is the sum of absolute differences or some other technically feasible cost metric.

Above, it is stated that the shade normalization block 122 applies a plurality of shade patterns to generate candidate blocks. In some examples, this plurality of shade patterns is a pre-defined set of shade patterns. The predefined set includes a number of different patterns, each of which defines a number of different areas that are shaded or unshaded. Each pattern can include different shade values in different areas. In an example, a shade pattern includes a vertical, horizontal, or diagonal gradient. In an example, at least two shade patterns of the plurality of shade patterns applied to the candidate blocks includes two different shade patterns that differ only by a multiplier. In other words, the shade normalization block 122 generates, from at least one shade template of a core set of shade templates, multiple shade patterns. A shade template defines a baseline shade pattern and a multiplier multiplies the luminosity modification values for the base shade pattern to different degrees. Thus, the shade normalization block 122 is able to generate multiple shade patterns from a single shade template by applying different multipliers from the shade template.

As stated above, a subject block 302 is defined by shade pattern 310 and underlying content 308. The shade normalization block 122 generates the underlying content 308 by subtracting that shade pattern from the subject block 302 to obtain the underlying content 308, which is then passed to the rest of the encoder 120. In some examples, subtracting the shade pattern means subtracting the luminance values of the shade pattern from the subject (input) block 302 to obtain the underlying content 308. Correspondingly, in the decoder 150, reconstruction of the block involves adding the luminance values specified by the shade pattern 310 to the decoded block (e.g., provided by the reconstruct block 156) to obtain the final block with the shade pattern applied.

In summary, a shade normalization block 122 processes an image to extract a shade pattern 310 and an underlying content 308. The remainder of the encoder 120 encodes the underlying content 308 and the encoder 120 outputs the encoded image and the shade pattern 310 as the shade metadata. The decoder 150 decodes the underlying content 308 and a shade de-normalization block 158 applies the shade metadata to restore the original image input to the encoder 120. The shade metadata side-channel allows video to be encoded with a lower amount of total bytes by removing high frequency, high amplitude variations from the image to be encoded and representing those variations with a relatively low amount of data (the shade metadata).

FIG. 3B illustrates example shade templates 350. In each shade template 350, a cross-hatched portion is a shaded portion that indicates a portion of the template 350 indicating a modification of luminance values and a portion with no cross-hatching is a non-shaded portion that indicates no modification of luminance values. The examples include a diagonal band template 350(1), having diagonal shaded portions and diagonal non-shaded portions; a vertical divisional template 350(2) with vertical shaded and non-shaded portions; an un-shaded template 350(3) with no shade applied, a horizontal division template 350(4) with horizontal shaded and non-shaded portions; a vertical division template 350(5) with vertical shaded and non-shaded portions reversed as compared with the vertical division template 350(3), a checkered template 350(6), a fully shaded template 350(7), and a checkered template 350(8). It should be understood that these templates 350 are examples and that any technically feasible templates 350 could be used.

Figure 4:
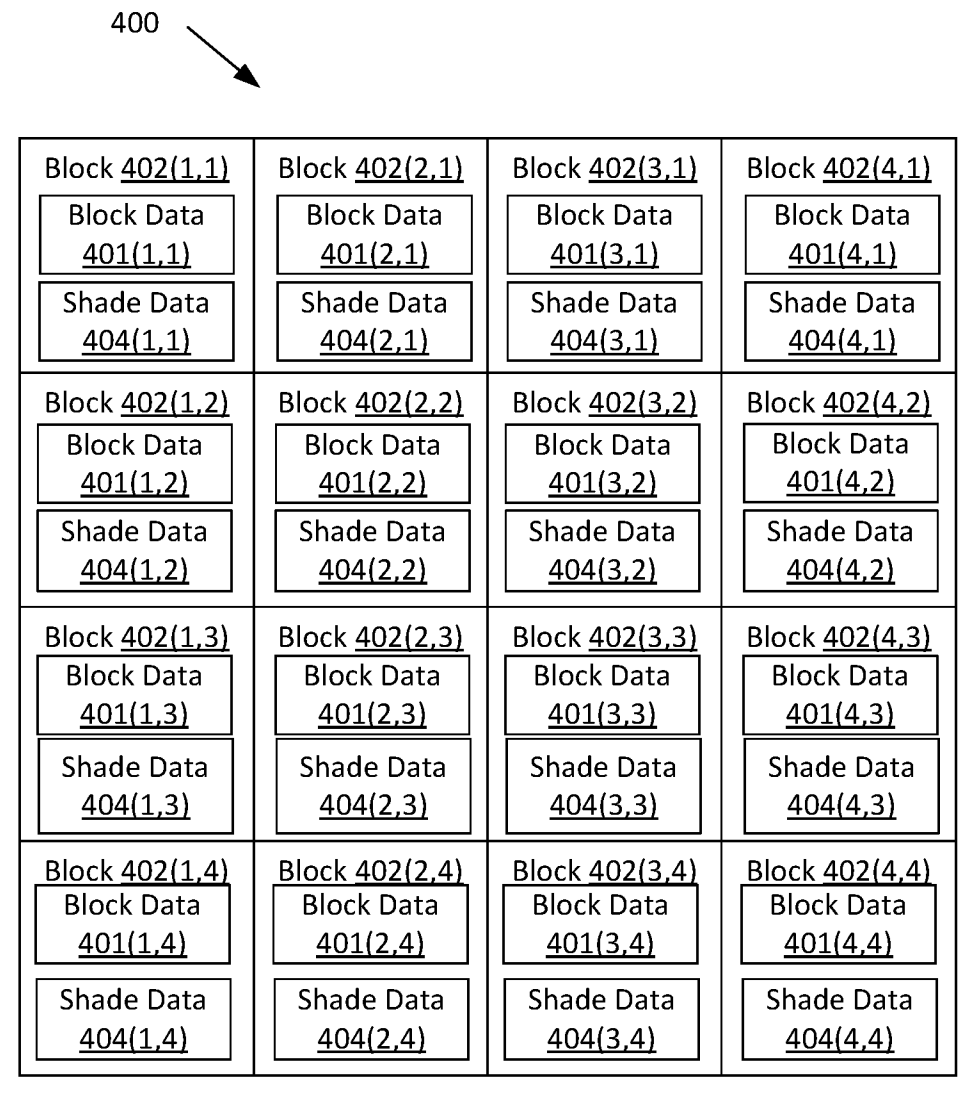

FIG. 4 illustrates an example portion of an image 400, according to an example. The image 400 represents at least a portion of an image that is encoded (e.g., by encoder 120). The image 400 includes a plurality of blocks 402. Each block 402 includes block data 401 and shade data 404. The block data 401 is the underlying content 308 of FIG. 3A. The shade data 404 is the shade pattern 310 of FIG. 3A. As can be seen, an image includes a plurality of blocks 402, each of which specifies underlying content 308 and has an independent shade data 404. It is possible for any block 402 of the image 400 to have shade data 404 that is different from the shade data 404 of any other block 402 of the image 400. These differences can be differences in template, multiplier, luminosity change values, or can be any other differences.

Figure 5:
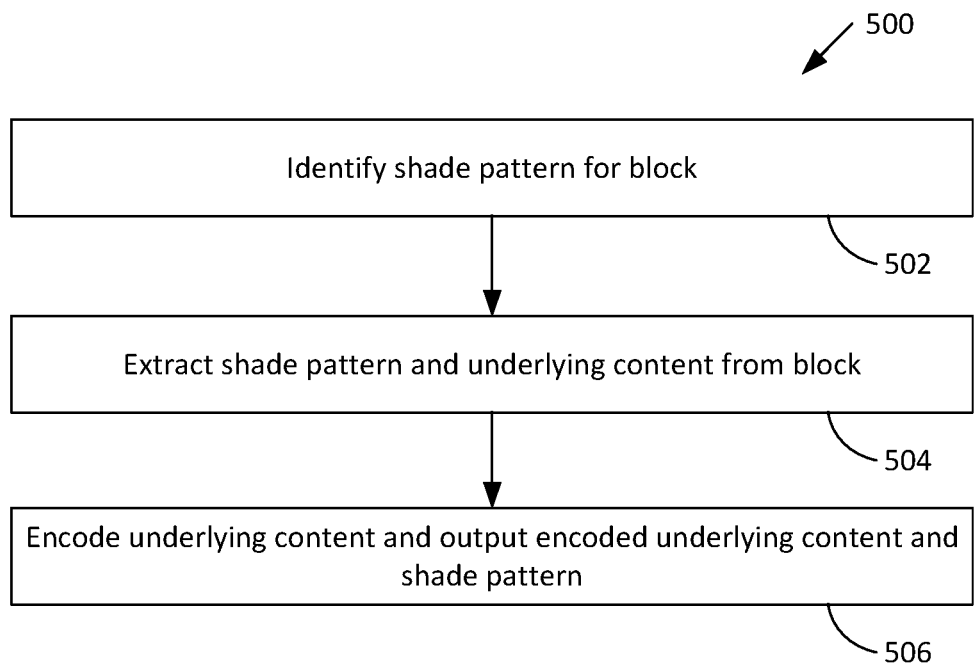
FIG. 5 is a flow diagram of a method for encoding video with shading information, according to an example.

FIG. 5 is a flow diagram of a method 500 for encoding video with shading information, according to an example. Although described with respect to the system of FIGS. 1-4, those of skill in the art will understand that any system, configured to perform the steps of the method 500 in any technically feasible order, falls within the scope of the present disclosure.

At step 502, a shade normalization block 122 identifies a shade pattern 310 for a block of a video. More specifically, the shade normalization block 122 identifies a pattern of luminance changes for different portions of this block, and records this pattern of luminance changes as the shade pattern 310. Any technically feasible technique for determining the shade pattern can be used. In an example, as described elsewhere herein, the shade normalization block 122 uses a prediction-based technique. In such a technique, the shade normalization block 122 identifies a reference block and tests a plurality of different shade patterns on the subject block to obtain a single shade pattern based on a cost score. Additional details are provided elsewhere herein.

At step 504, the shade normalization block 122 extracts the shade pattern 310 and the underlying content 308 from the block to be encoded. In some examples, extracting the block includes selecting the shade pattern as identified at step 502 and canceling the effects of that shade pattern from the block to be encoded in order to obtain the underlying content. In some examples, canceling such effects includes subtracting out the luminances indicated by the shade pattern from the subject block to obtain the underlying content 308.

At step 506, the encoder 120 encodes the underlying content to generate encoded underlying content. The output of the encoder 120 includes the underlying content and the shade pattern as described elsewhere herein. It should be understood that a particular frame of video has a number of different blocks, and so the encoding would happen many times to generate underlying content and a shade pattern for each block of a frame.

Figure 6:
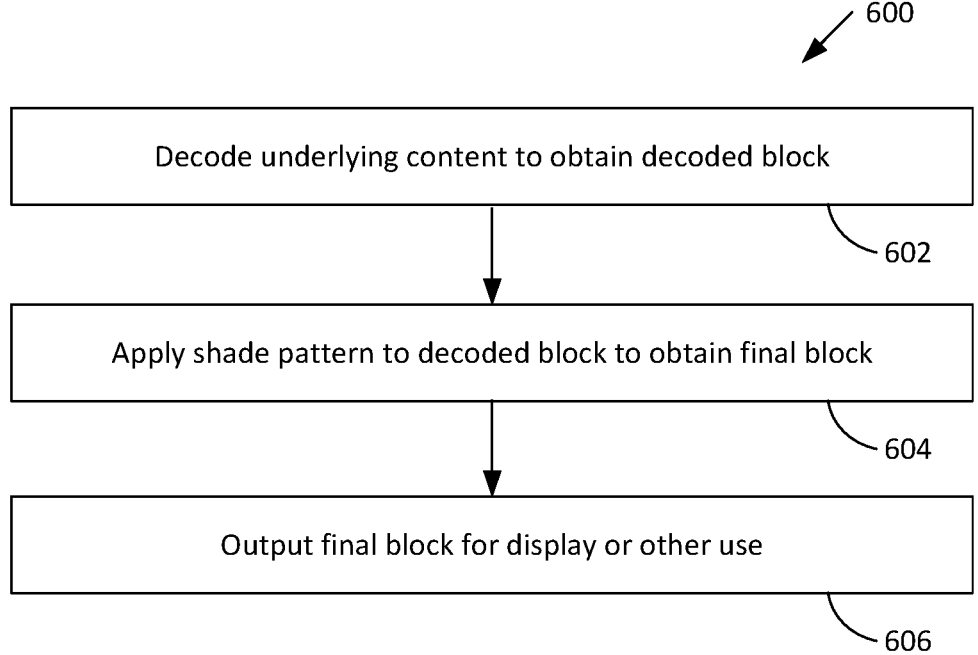
FIG. 6 illustrates a method for decoding video including shade metadata (e.g., the shade patterns), according to an example.

FIG. 6 illustrates a method 600 for decoding video including shade metadata (e.g., the shade patterns), according to an example. Although described with respect to the system of FIGS. 1-4, those of skill in the art will understand that any system, configured to perform the steps of the method 600 in any technically feasible order, falls within the scope of the present disclosure.

At step 602, a decoder 150 decodes the underlying content to obtain a decoded block. In some examples, this decoding includes performing entropy decode, performing an inverse transform, and reconstructing the result. At step 604, the shade de-normalization block 158 applies the shade pattern that is included with the encoded block to the decoded block to obtain a resulting block. In some examples, applying the shade pattern means applying the luminance changes specified by the shade pattern to the resulting block. At step 606, the decoder 150 outputs the final block for display or other use.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, including the encoder 120 and the shade normalization block 122, prediction block 124, transform block 126, and entropy encode block 128 as well as the decoder 150, entropy decode block 152, inverse transform block 154, reconstruct block 156, and shade de-normalization block 158, and/or the storage 108, are implemented fully in hardware, fully in software executing on processing units, or as a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for decoding video, the method comprising:
   decoding underlying content to obtain a decoded block, the decoding including an inverse transform operation; and
   applying a shade pattern to the decoded block to obtain a final block, the shade pattern being applied after reconstruction following the inverse transform operation, wherein the shade pattern comprises a selection of a shade template and a luminance multiplier that together specify a pattern of luminance modifications extracted from an input block in an encoding process to generate the underlying content.

2. The method of claim 1, wherein the decoding includes performing an entropy decode, performing an inverse transform, and performing a reconstruct.

3. The method of claim 1, wherein the shade pattern specifies luminance modifications to a plurality of portions of the decoded block.

4. The method of claim 3, wherein applying the shade pattern comprises modifying the decoded block based on the modifications to obtain the final block.

5. The method of claim 1, wherein the underlying content comprises content encoded according to a video codec.

6. The method of claim 5, wherein the shade pattern is external to the content encoded according to a video codec and is not encoded according to the video codec.

7. The method of claim 1, further comprising encoding a block to obtain the underlying content and the shade pattern.

8. The method of claim 7, wherein encoding the block includes performing prediction, a transform, and entropy encoding.

9. The method of claim 7, wherein obtaining the shade pattern includes extracting a shade pattern based on a cost function.

10. A device for decoding video, the device comprising:
    a first decoder portion configured to decode underlying content to obtain a decoded block, the decoding including an inverse transform operation; and
    a second decoder portion configured to apply a shade pattern to the decoded block to obtain a final block, the shade pattern being applied after reconstruction following the inverse transform operation, wherein the shade pattern comprises a selection of a shade template and a luminance multiplier that together specify a pattern of luminance modifications extracted from an input block in an encoding process to generate the underlying content.

11. The device of claim 10, wherein the decoding includes performing an entropy decode, performing an inverse transform, and performing a reconstruct.

12. The device of claim 10, wherein the shade pattern specifies luminance modifications to a plurality of portions of the decoded block.

13. The device of claim 12, wherein applying the shade pattern comprises modifying the decoded block based on the modifications to obtain the final block.

14. The device of claim 10, wherein the underlying content comprises content encoded according to a video codec.

15. The device of claim 14, wherein the shade pattern is external to the content encoded according to a video codec and is not encoded according to the video codec.

16. The device of claim 10, further comprising an encoder configured to encode a block to obtain the underlying content and the shade pattern.

17. The device of claim 16, wherein encoding the block includes performing prediction, a transform, and entropy encoding.

18. The device of claim 16, wherein obtaining the shade pattern includes extracting a shade pattern based on a cost function.

19. A non-transitory computer-readable medium storing instructions that, when executed by a processor, cause the processor to perform operations comprising:
    decoding underlying content to obtain a decoded block, the decoding including an inverse transform operation; and
    applying a shade pattern to the decoded block to obtain a final block, the shade pattern being applied after reconstruction following the inverse transform operation, wherein the shade pattern comprises a selection of a shade template and a luminance multiplier that together specify a pattern of luminance modifications extracted from an input block in an encoding process to generate the underlying content.

20. The non-transitory computer-readable medium of claim 19, wherein the decoding includes performing an entropy decode, performing an inverse transform, and performing a reconstruct.

* * * * *